UNITED STATES PATENT OFFICE.

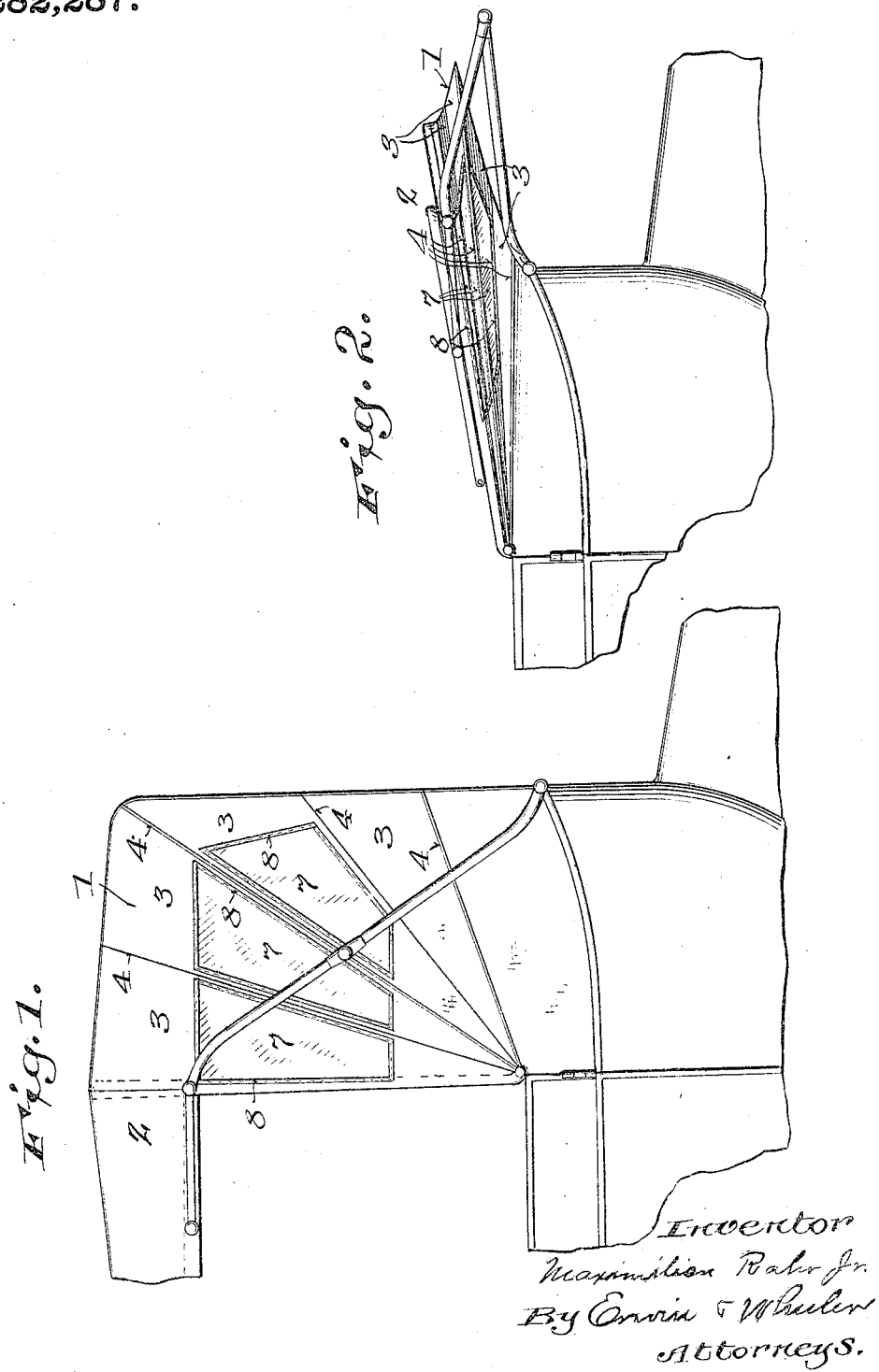

MAXIMILIAN RAHR, JR., OF MANITOWOC, WISCONSIN.

AUTOMOBILE-CURTAIN.

1,282,287.  Specification of Letters Patent.  Patented Oct. 22, 1918.

Application filed August 11, 1917. Serial No. 185,646.

*To all whom it may concern:*

Be it known that I, MAXIMILIAN RAHR, Jr., a citizen of the United States, residing at the city of Manitowoc, county of Manitowoc, and State of Wisconsin, have invented new and useful Improvements in Automobile-Curtains, of which the following is a specification.

My invention relates to improvements in curtain extensions for auto tops, this application being a companion application to one heretofore filed by me Serial No. 141,119, and pursuant to which Letters Patent of the United States numbered 1,249,828 were issued December 11, 1917.

In the companion application, my invention was embodied in a seat of detachable side curtains, whereas it is the object of my present invention to provide means whereby a set of curtains of the same general character as those disclosed in said former application may be connected, permanently or otherwise, with the upper and rear walls of the top without detaching them in such a manner as to fold with the top, thus dispensing with the necessity for removing and storing these curtains when the top is in folded position.

This invention therefore relates particularly to the rear set of side curtains, *i. e.*, those which are located at the respective ends of the rear seat or at the ends of a single seat of a coupé or one-seated vehicle.

In order to attain my present object while preserving the principle of radiating cross lines disclosed in my former application, it is necessary that the curtains embodying the present invention shall be subdivided into curtain sections which are triangular in form and are connected with each other by cross lines or flexible joints radiating from a common apex located at or adjacent to the upper front corner of the end wall of the seat, the folding lines of the respective sections diverging outwardly and upwardly when the curtains are in position for use, and the arrangement being such that the curtains may be provided with transparent portions which may be either flexible or inflexible and which are so located as to allow the sections to be folded one upon another when the top is in the folded position.

My invention is further explained by reference to the accompanying drawing, in which—

Figure 1 represents a portion of the upper rear end of a coupé provided with one of my foldable curtains, shown in position for use.

Fig. 2 is a similar view of an automobile to that shown in Fig. 1, showing my curtain in its folded position as it appears when the top is down.

Like parts are identified by the same reference numerals throughout both views.

1 represents one of my curtains as it appears attached to one side of the rear end of an automobile cover 2. It will be understood that a similar curtain to that shown in Fig. 1 is also adapted to be supported from the opposite side of the vehicle. Each of the curtains 1 are preferably subdivided into a plurality of sections 3, and are provided with a plurality of seams and creases 4, constituting flexible joints connecting the respective sections, whereby the same as soon as released is dropped in the folded position shown in Fig. 2, whereby it is connected with the cover 2. 7 represents a plurality of transparent sections which are secured to the curtain by series of stitches 8, in the ordinary manner.

It will be observed in Fig. 1 that the two lower sections 3 are continuations of the back wall or covering of the top, whereas the two upper sections 3 are continuations of the upper wall or canopy. These sections are preferably formed integral with the respective walls of which they are continuations, although this is not essential. All of the sections converge toward the axis about which the main bow of the top swings, this bow being connected with the body substantially at the forward upper corner of the arm or end wall of the seat. The lower margin of the lower section 3 is preferably secured to the seat or its upholstery, whereas the front margin of the upper or front section 3 is preferably secured directly to the main bow, as shown in Fig. 1. These connections may be either permanent or detachable, and it is not essential to my invention that any positive physical connection may be made, since the curtains will ordinarily be stretched or held at sufficient tension when the top is up to retain the margins above referred to in substantial contact with the upper margin of the side wall and with the main bow respectively.

In the construction shown, the side curtain embodying my invention is subdivided by crease lines or flexible joints into four triangular sections, converging to the pivot pin of the main bow, but the number of sections is not material to my invention and may be increased or diminished if desired.

The arrangement is such that, when the top is folded, the several sections may be folded alternately in opposite directions and swung inwardly from each alternate folding line as clearly indicated in Fig. 2. In this position, the curtains may be conveniently inclosed in any ordinary boot employed to inclose the top. The converging ends of the curtain 3 are sufficiently narrow in those portions which fold along the end wall of the seat to avoid interference with the comfort of the occupants, and the transparent portions 7 are located in the wider portions of the curtain sections, these portions being folded across and beyond the back of the seat to such an extent that danger of injury thereto is avoided and no inconvenience afforded to the occupants of the vehicle.

Having thus described my invention what I claim as new and desire to secure by Letters Patent, is:—

1. The combination with a folding vehicle top, of a set of curtain sections having side margins extending downwardly and forwardly from the upper and back walls of the top toward a common apex substantially coinciding with the pivotal axis about which one of the top supporting bows swings, whereby said sections are adapted to be folded with the top without being disconnected therefrom.

2. The combination with a vehicle having a folding canopy top, of a set of tapering curtain sections extending downwardly and forwardly from the upper and back portion of the top with their side margins flexibly connected along lines converging toward a common apex about which the top folds, said sections being adapted to fold upon each other alternately in opposite directions when the top is folded and to swing downwardly with the top to the position of non-use.

3. The combination with a vehicle having a canopy top adapted to fold about a supporting pivotal axis connected with seat ends, of a canopy covering provided with triangular extensions at each side, the side margins of which are flexibly connected in downwardly and forwardly converging lines terminating substantially in a common apex in the vicinity of the pivotal axis of the bow, said sections being adapted to fold upon each other alternately in opposite directions when the bow is swung rearwardly and downwardly about said axis.

4. The combination with a vehicle having a canopy top adapted to fold about a supporting pivotal axis connected with seat ends, of a canopy covering provided with triangular extensions at each side, the side margins of which are flexibly connected in downwardly and forwardly converging lines terminating substantially in a common apex in the vicinity of the pivotal axis of the bow, said sections being adapted to fold upon each other alternately in opposite directions when the bow is swung rearwardly and downwardly about said axis.

In testimony whereof I affix my signature in the presence of two witnesses.

MAXIMILIAN RAHR, Jr.

Witnesses:
O. C. WEBER,
FREDERICK W. NOLTE.

Copies of this patent may be obtained for five cents each, by addressing the "Commissioner of Patents, Washington, D. C."